United States Patent [19]

Densmore et al.

[11] Patent Number: 5,187,786
[45] Date of Patent: Feb. 16, 1993

[54] METHOD FOR APPARATUS FOR IMPLEMENTING A CLASS HIERARCHY OF OBJECTS IN A HIERARCHICAL FILE SYSTEM

[75] Inventors: Owen M. Densmore; David S. H. Rosenthal, both of Palo Alto, Calif.

[73] Assignee: Sun Microsystems, Inc., Mountain View, Calif.

[21] Appl. No.: 681,071

[22] Filed: Apr. 5, 1991

[51] Int. Cl.⁵ .................................... G06F 12/08
[52] U.S. Cl. ..................... 395/600; 364/DIG. 1; 364/283.2; 364/222.81
[58] Field of Search ............... 395/600, 650; 364/DIG. 1 MS File

[56] References Cited

U.S. PATENT DOCUMENTS

| | | | |
|---|---|---|---|
| 4,468,728 | 8/1984 | Wang | 364/DIG. 1 |
| 4,558,413 | 12/1985 | Schmidt et al. | 364/DIG. 1 |
| 4,719,571 | 1/1988 | Rissanen et al. | 395/600 |
| 4,901,225 | 2/1990 | Shiraishi | 364/DIG. 1 |
| 4,908,759 | 3/1990 | Alexander, Jr. et al. | 364/DIG. 1 |
| 4,945,475 | 7/1990 | Bruffey et al. | 364/DIG. 1 |
| 5,057,996 | 10/1991 | Cutler et al. | 395/650 |

Primary Examiner—Thomas M. Heckler
Attorney, Agent, or Firm—Blakely Sokoloff Taylor & Zafman

[57] ABSTRACT

A method and apparatus for implementing a class hierarchy of objects in a hierarchical file system is disclosed, which does not require the support of additional file attributes by the hierarchical file system, and has particular application to object oriented programming in window-based computer systems. The class hierarchy comprises a root class, a plurality of classes and a plurality of class instances. The root class is implemented with a hierarchy of root class directory and root class files. Each class is implemented with a hierarchy of class directories and class files comprising the class methods, and the initial values of the class instance variables. Each class instance is implemented with a hierarchy of class instance directory and class instance files comprising the class instance variables. Each hierarchy of directories and files also comprises a path file. The content of these path files are logically related to each other, based on their class' relationships. By controlling the invocation of class methods, using these path files, inheritance is achieved. By accessing the class instance variables through the class methods, data abstraction is also achieved. Additionally, the method and apparatus also supports the pseudo class instance/class "Self" and "Super" when invoking another class method by a class method.

26 Claims, 9 Drawing Sheets

CLASS INSTANCE MAKING METHOD

```
method new
# new instance-name init-args
     mkdir $1
     echo -n "`pwd`:`cat PATH`">$1/PATH
     if [ "`ls INSVARS`" ] ; then
          cp INSVARS/* $1
     fi
endmethod
```

*Figure 1a* makeclass

```sh
#!/bin/sh
# makeclass classname superclass [insvars]

if [ $# -lt 2 ]; then
      echo 'usage: makeclass classname superclass [insvars]'
      exit 1
fi CLASSNAME=$1; shift
SUPERCLASS=$1; shift mkdir $CLASSNAME
mkdir $CLASSNAME/INSVARS if [ "$SUPERCLASS" = "" ]; then
      SUPERPATH=${CLASS:-$HOME/Classes}:/usr/ucb:/bin:/usr/bin
else
      # absolute-ize the superclass directory
      SUPERCLASS=`cd $SUPERCLASS;pwd` construct the superclass PATH
      IF [ -s $SUPERCLASS/PATH ]; then
            SUPERPATH=$SUPERCLASS:`cat $SUPERCLASS/PATH`
      else
            SUPERPATH=$SUPERCLASS
      fi initialize insvars with super's
      if [ "`ls $SUPERCLASS/INSVARS`" ]; then
            cp $CLASSNAME/INSVARS/* $CLASSNAME/INVARS
      fi
fi echo -n $SUPERPATH>$CLASSNAME/PATH add this class's ins vars
while [ $(#) -gt 0 ]; do
      VAR=$CLASSNAME/INSVARS/`expr $1 : '\(.*\)"'`
      VAL=`expr $1 : '.*=\(.*\)'`
      echo -n $VAL > $VAR
      shift
done cd $CLASSNAME
sed '
      s:^[    ][    ]*endmethod:endmethod;
      s:^[    ]*method[    ]:method <<\\endmethod:
' | PATH=$PATH:$PWD sh
```

*Figure 1b*

SEND

```
# !/bin/sh
# send obj method args > results
# obj may be "literals" self and super.

INITMETHOD=$METHOD
OBJECT=$1; shift
METHOD=$1 case "$OBJECT" in
    self)
            PATH=.:"`cat PATH`
    ;;
    super)
            for DIR in `echo $PATH | sed´ s/:/ /g`; do
                    if [ -f $DIR/$INITMETHOD ]; then
                            break
                    fi
            done
            PATH=`cat $DIR/PATH`
    ;;
    *)
            SENTFROM=$PWD
            cd $OBJECT
            PATH=.:`cat PATH`
    ;;
esac export PATH METHOD SENTFROM
exec $*
```

*Figure 1c*

METHOD FOR APPARATUS FOR IMPLEMENTING A CLASS HIERARCHY OF OBJECTS IN A HIERARCHICAL FILE SYSTEM

BACKGROUND OF THE INVENTION

1. Field of the Invention

The present invention is related to the field of computer systems. Specifically the present invention relates to the field of implementing a class hierarchy of objects in a hierarchical file system.

2. Art Background

It is quite common in the computer industry to offer on any computer system a wide range of applications, such as desktop publishing, databases, spreadsheets, graphics and so on. Typically in a window-based computer system, there is a special application often called a desktop manager to invoke and manipulate the various applications when required by the users. For instance, the desktop manager displays icons representing objects and interprets user gestures such as clicking on icons, dragging icons from place to place and dropping icons on other icons as being requests from the users for certain methods of the objects to be invoked. To do so, the desktop manager must know how objects are represented in the file system of the window-based computer system. Similarly, the same type of information must be available to the applications for them to be able to invoke each other.

In the realm of object oriented programming, an object is an entity comprising data and operations which can be invoked to manipulate the data. Object users manipulate the data by invoking the operations. Objects are organized as class instances and classes. The data are contained in the class variables and/or the class instance variables. The operations that can be invoked to manipulate the data are defined in the methods of the class. Additionally, these classes and a root class are ordered into a hierarchy. Each class, except the root class, is subclassed to at least one of the other classes, with the subclass inheriting the class methods, class instance variables and class variables of the other classes. The other classes are also referred as the super classes of the subclass. A methods of a class is invoked on a class or an instance of a class by sending a message comprising the class/class instance, the method and the method's its arguments, using a send primitive. Furthermore, in the context of a class method invoking another class method, there is a pseudo class instance/class "Self" and a pseudo class "Super". The pseudo class instance/class "Self" refers to the current class instance/class upon which the invoking class method was invoked. The pseudo class "Super" refers to the invoking class method's super class. For further information on object-oriented design and programming techniques, see B. Meyer, *Object-oriented Software Construction*, (Prentice Hall, 1988), pp. 65-372.

The requirement of enabling the applications, the desktop manager in particular, to have access to object representation information, may be satisfied through additional file attributes in the file system of the window-based computer system. For example, each file in the Macintosh system comes in two parts, a data fork and a resource fork. The resource forks are used for many things, including icons, fonts, cursors and an application's code. Each resource has a resource type, for examples, "ICONS", or "MENUS". The resource type determines the resource information content and the resource information structure. The resource information content and structure are agreed on between the application that creates them and the applications that use them. For further information on resources in Macintosh, see S. Chernicoff, *Macintosh Revealed; Vol 1—Unlocking the Toolbox*, 2nd Edition (Hayden Books, 1988), pp. 275-326.

For a window-based computer system with a hierarchical file system, for example, UNIX, there are two main ways in which objects are represented:

(1) In the form of normal files whose names and attributes are indices into a database of heuristics read by the desktop manager. An example of such heuristics would be files whose names end with the character string ".c". These files use a particular icon and are opened by invoking the command "vi" on them. It is believed the heuristics technique was first used at the Information Technology Center at Carnegie-Melon University in 1984;

(2) In the form of directories read by the desktop manager. For example, an object is represented as a directory with a convention governing the names in the directory used for particular attributes. An icon image might be found in a file called "Icon" and the command to be invoked on double-clicked in the file called "double-clicked.". The directory technique is believed to be employed by NeXT's desktop manager found in systems manufactured by NeXT, Inc., Redwood City, Calif., among others. (NeXT is a registered trademark of NeXT, Inc.)

However, neither of these approaches fully support data abstraction and inheritance, the hallmarks of object oriented programming. Data abstraction means that the implementation of objects are encapsulated from the use of the objects. Inheritance means that the implementation of objects are related to each other hierarchically.

As will be described, the present invention overcomes the disadvantages of the prior art, and provides a method and apparatus for object representation in a hierarchical file system, without requiring the support of additional file attributes by the hierarchical file system.

SUMMARY OF THE INVENTION

A method and apparatus for implementing a class hierarchy of objects in a hierarchical file system is disclosed, which does not require the support of additional file attributes by the hierarchical file system, and has particular application to object oriented programming for a window-based computer systems. Each object is organized as a class instance of a class, or a class. These classes and a root class are organized into the class hierarchy.

The method for implementing a class hierarchy of objects of the present invention comprises the steps of implementing the root class by a hierarchy of a root class directory and root class files, implementing each of the other classes by a hierarchy of class directories and class files, and implementing each of the class instances by a hierarchy of a class instance directory and class instance files. Additionally, the method further comprises the step of providing a message sending procedure for invoking a class method on a class instance or a class.

The apparatus for implementing a class hierarchy of objects of the present invention comprises a hierarchy of a root class directory and root class files implementing the root class, and a class making procedure for implementing each of the other classes by a hierarchy of class directories and class files. The root class files comprise a class instance making method file containing a class instance making method for implementing each of the class instances by a hierarchy of a class instance directory and class instance files. Additionally, the apparatus of the present invention further comprises a message sending procedure for invoking a class method on a class instance or a class. The message sending procedure also support invoking another class method by a class method on a pseudo class instance/class "Self" or a pseudo class "Super".

BRIEF DESCRIPTION OF THE DRAWINGS

FIGS. 1a, 1b and 1c show the exemplary UNIX Shell implementations of the class instance making method, the class making procedure and the message sending procedure of the apparatus of the present invention.

NOTATIONS AND NOMENCLATURE

Figure 1:
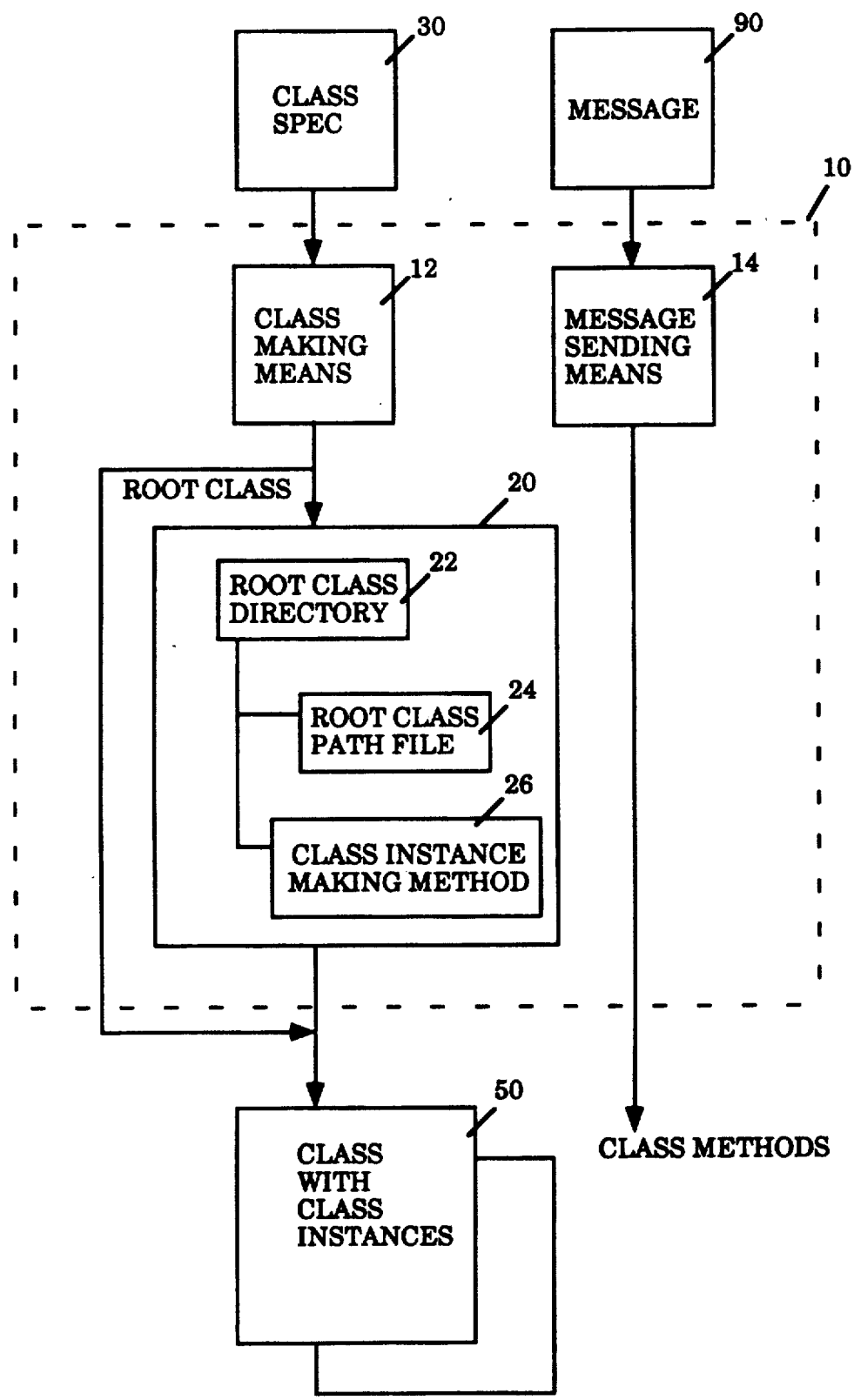
FIG. 1 shows a block diagram illustrating the preferred embodiment of the apparatus of the present invention for implementing a class hierarchy of objects in a hierarchical file system.

The detailed description which follows is presented largely in terms of procedures executed by a computer. These procedural descriptions are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with programs written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for implementing a class hierarchy of objects in a hierarchical file system is disclosed, which does not require the support of additional file attributes by the hierarchical file system and has particular application to object oriented programming in window-based computer systems. In the following description for purposes of explanation, specific numbers, materials, and configurations are set forth in order to provide a thorough understanding of the present invention. However, it will be apparent to one skilled in the art that the present invention may be practiced without the specific details. In other instances, well known system are shown in diagrammatical or block diagram form in order not to obscure the present invention unnecessarily.

Referring now to FIG. 1, a block diagram illustrating the preferred embodiment of the apparatus of the present invention for implementing a class hierarchy of objects in a hierarchical file system is shown. Each of the objects is organized as a class instance of a class or a class. These classes and a root class are organized into the class hierarchy.

The preferred embodiment of the apparatus of the present invention 10 comprises a hierarchy of a root class directory and root class files 20, a class making procedure 12 comprising an interface (not shown) for receiving a class specification 30 as input, and a message sending procedure 14 comprising an interface (not shown) for receiving a message 90 as input.

The hierarchy of a root class directory and root class files 20 implements the root class of the class hierarchy of objects. The hierarchy 20 comprises a root class directory 22, a root class path file 24 and a class instance making method file 26. The root class directory 22, the root class path file 24 and the class instance making method file 26 may be stored on any storage subsystem of a computer system, preferably on a direct access storage subsystem.

The root class directory 22 facilitates access of the root class files in the hierarchy 20. The root class directory 22 is named after the root class. The root class path file 24 and the class instance making method file 26 are members of the root class directory 22.

The root class path file 24 facilitates invocation of the root class method. The root class path file 24 is named with a special name indicative of the nature of the file, for example, "PATH". The root class path file 24 comprises a plurality of class path directory names. The class path directory names are accessed by the class making procedure 12 when implementing a new class subclass to the root class, and by the message sending procedure 14 when invoking the root class method. Implementing a new class and invoking a class method will be discussed in further details later.

The class instance making method file 26 is for storing a class instance making method for implementing a hierarchy of class instance directory and class instance files for a class instance. The class instance making method is invoked by the message sending procedure 14 upon receipt of a message requesting the invocation. Implementing a new class instance will also be discussed in further details later. The class instance making method may be implemented in any well known programming language, for example, UNIX Shell for the UNIX environment (UNIX is a registered trademark of AT&T). FIG. 1a shows an exemplary class instance making method implemented in UNIX Shell.

Continuing referring to FIG. 1, the class making procedure 12 is for implementing a hierarchy of class directories and class files 50 for a class. The class making procedure 12 comprises an interface (not shown) for receiving a class specification 30 as input. Upon receipt of the class specification 30, the class making procedure 12 implements a hierarchy of class directories and class files 50 accordingly. Similar to the class instance making method, the class making procedure 12 may be implemented in any well known programming language, for example, UNIX Shell for the UNIX environment. FIG. 1b shows an exemplary class making procedure 12 implemented in UNIX Shell.

Figure 2:
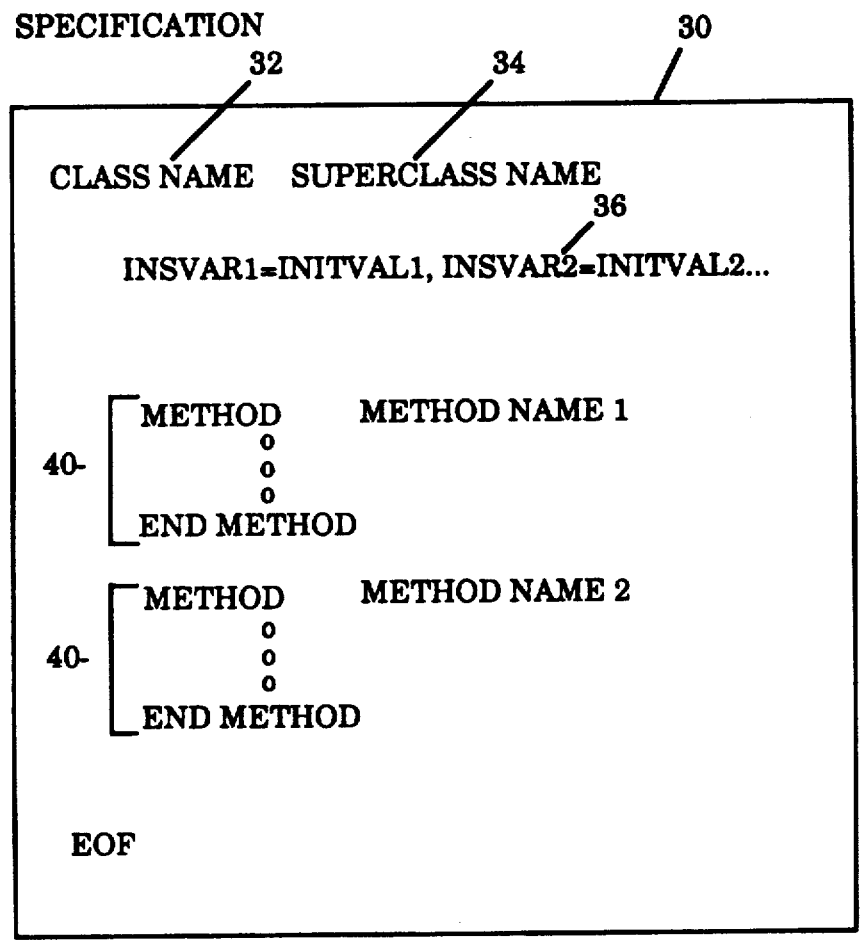
FIG. 2 shows a block diagram illustrating a class specification used by the class making procedure of the apparatus of the present invention as input for implementing a class.

Referring now to FIG. 2, a block diagram illustrating the class specification used by the class making procedure of the apparatus of the present invention as input for implementing a class, is shown. The class specification 30 comprises information necessary to implement a hierarchy of class directories and class files for a class. The class specification 30 comprises a class name 32, one or more super class names 34, and one or more class methods 40. Additionally, the class specification 30 may further comprise one or more class instance variables and their corresponding initial values 36.

The class name 32 is the name of the class to be implemented. The super class name 34 is the name of the super class, whose class instance variables including the initial values, and class methods are to be inherited for the new class being implemented. The class instance variables and their corresponding initial values 36, and the class methods 40 are the new class instance variables and their corresponding initial values, and the new class methods to be added for the new class being implemented.

Similar to the class instance making method, the new class methods 40 being added for a new class, may be implemented in any well known programming language. Likewise, the class specification 30 for a new class may be implemented in any syntax.

Figure 3:
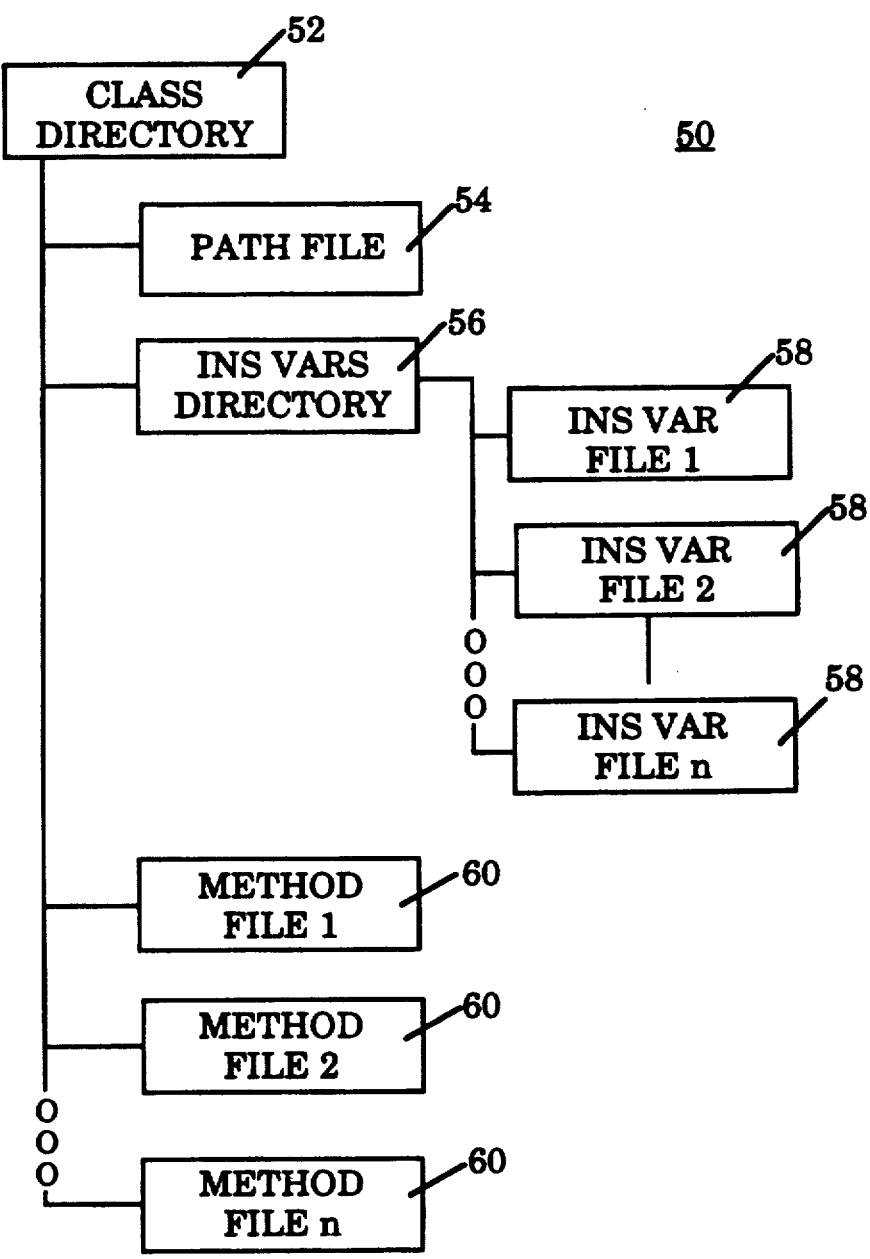
FIG. 3 shows a block diagram illustrating a hierarchy of class directories and class files implemented for a class, by the class making procedure of the apparatus of the present invention.

Referring now to FIG. 3, a block diagram illustrating a hierarchy of class directories and class files implemented for a class, by the class making procedure of the apparatus of the present invention, is shown. The hierarchy of class directories and class files 50 implements one of the class of the class hierarchy of objects, other than the root class. A hierarchy of class directories and class files 50 for a class other than the root class comprises a class directory 52, a class path file 54, and at least one class method file 60. Additionally, the hierarchy of class directories and class files 50 may further comprise a class instance variable directory 56, and one or more class instance variable files 58. The class directory 52, the class path file 54, the class method files 60, the class instance variable directory 56, and the class instance variable files 58 may be stored on any storage subsystem of a computer system, preferably a direct access storage subsystem.

The class directory 52 facilitates access of the class instance variable directory 56 and the class files 54, 60 in the hierarchy 50. The class directory 52 is created and named after the class by the class making procedure, based on the class name in the class specification. The class path file 54, the class instance variable directory 56, and the class method files 60 are made members of the class directory 52 by the class making procedure.

The class path file 54 facilitates invocation of the class methods. The class path file 54 is created and named by the class making procedure, with the same special name used for the root class path file. The class path file 54 comprises a plurality of class path directory names. The class path directory names comprises the class directory name of the class' super class, and the class path directory names of the class's super class. The class directory name of the class's super class and the class path directory names of the class's super class, are retrieved from the hierarchy of the class's super class, by the class making procedure, based on the name of the super class in the class specification. The class path directory names are accessed by the class making procedure when implementing a new class subclass to the class implemented by the hierarchy 50, and by the message sending procedure when invoking a class method of the class implemented by the hierarchy 50. Invoking a class method will be discussed in further details later.

The class instance variable directory 56 facilitates access of the class instance variable files 58. The class instance variable directory 56 is created and named by the class making procedure, with a special name indicative of the nature of the directory, for example, "INS-VAR". The class instance variable files 58 are made members of the class instance variable directory 56 by the class making procedure.

The class instance variable files 58 are for holding the initial values of the class instance variables. The class instance variable files 58 are created and made members of the class instance variable directory 56 by the class making procedure, based on the class specification. The class instance variable files 58 are accessed by the class instance making method of the root class when implementing a new class instance. Implementing a new class instance will be discussed in further details later.

The class method files 60 are for holding the class methods. The class method files 60 are created and made members of the class directory 52 by the class making procedure, based on the class specification. The class method files 60 comprise the class methods. The class methods are invoked by the message sending procedure upon receipt of a message requesting the invocation. Invoking a class method will be discussed in further details later.

Figure 4:
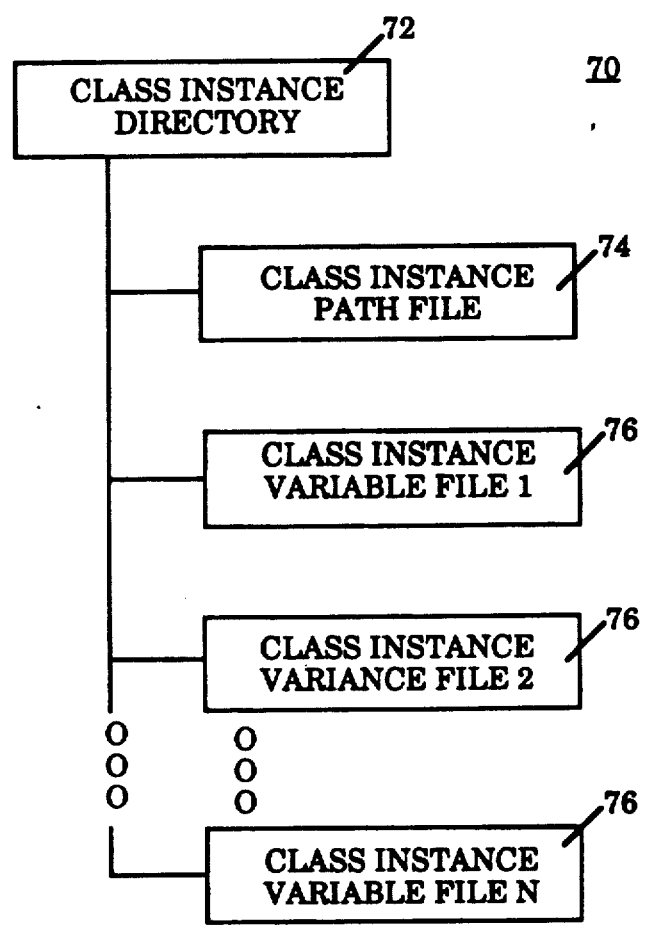
FIG. 4 shows a block diagram illustrating a hierarchy of class instance directory and class instance files implemented for a class instance, by the class instance making method of the root class of the apparatus of the present invention.

Referring now to FIG. 4, a block diagram illustrating a hierarchy of a class instance directory and class instance files implemented for a class instance, by the class making method of the root class of the apparatus of the present invention, is shown. The hierarchy of a class instance directory and class instance files 70 implements one of the class instances of the class hierarchy of objects. A hierarchy of a class instance directory and class instance files 70 for a class instance comprises a class instance directory 72, a class instance path file 74, and one or more class instance variable files 76. The class instance directory 72, the class instance path file 74 and the class instance variable files 76 may be stored on any storage subsystem of a computer system, preferably on a direct access storage subsystem.

The class instance directory 72 facilitates access of the class instance files 74, 76 in the hierarchy 70. The class instance directory 72 is created and named after the class instance by the class instance making method, based on the arguments received. The class instance path file 74, and the class instance variable files 76 are made members of the class instance directory 72 by the class instance making method.

The class instance path file 74 facilitates invocation of the class methods of the class instance's class. The class instance path file 74 is created and named by the class instance making method, with the same special name used for the root class path file. The class instance path file 74 comprises a plurality of class path directory names. The class path directory names comprises the class directory name of the class instance's class, and the class path directory names of the class instance's class. The class directory name of the class instance's class and the class path directory names of the class instance's class, are retrieved from the hierarchy of the class instance's class, by the class instance making method, based on the argument received. The class path directory names are accessed by the message sending procedure when invoking a class method of the class instance's class. Invoking a class method will be discussed in further details later.

The class instance variable files 76 are for holding the current values of the class instance variables. The class instance variable files 76 are copied from the hierarchy of the class instance's class and made members of the class instance directory 72, by the class instance making method, based on the arguments received. The class instance variable files 76 are accessed by the class methods of the class instance's class when invoked on the class instance. Invoking a class method will be discussed in further details later.

Figure 5:
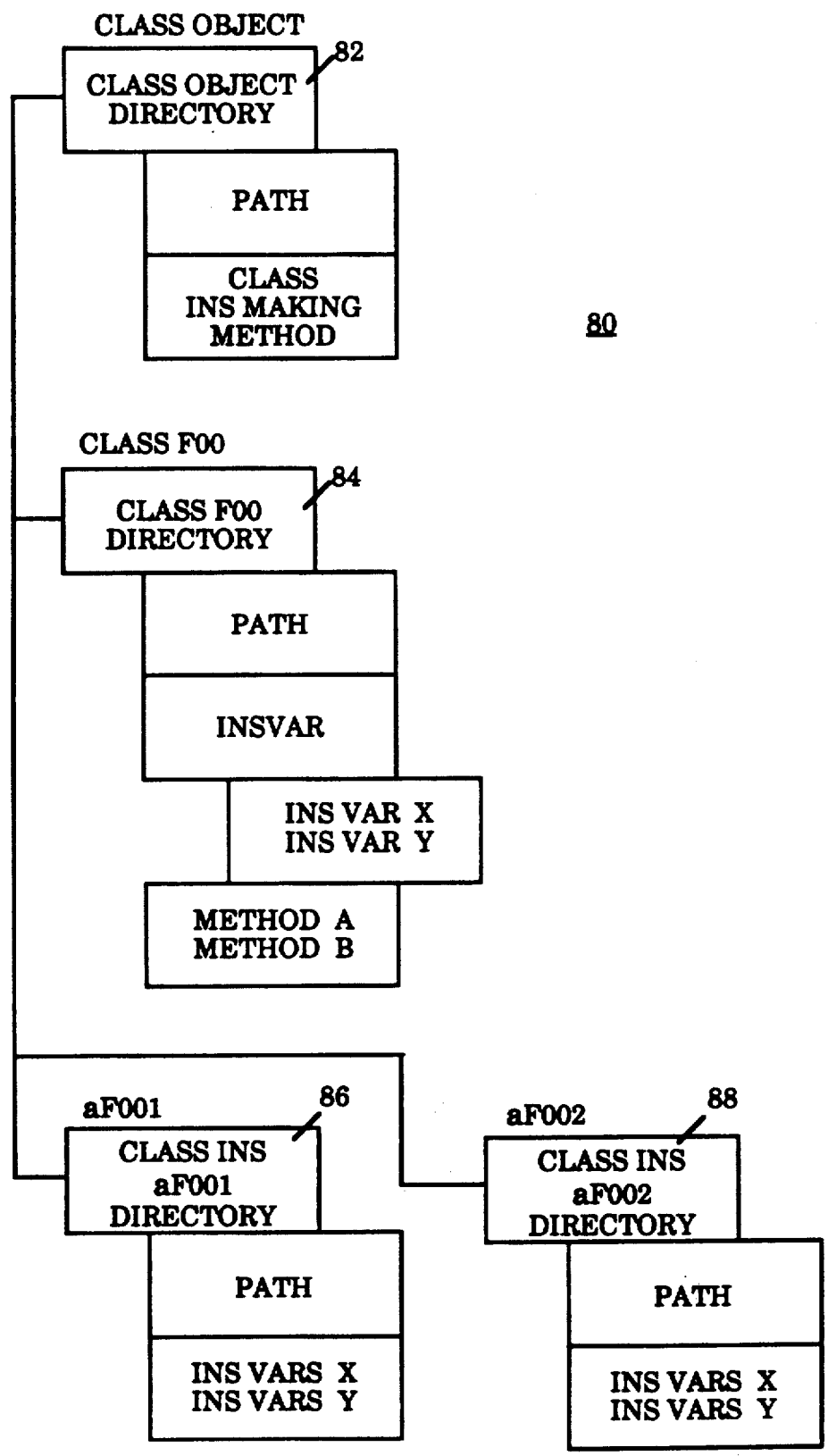
FIG. 5 shows a block diagram illustrating an exemplary class hierarchy of objects comprising a root class, an exemplary class and two exemplary class instances.

Referring now to FIG. 5, a block diagram illustrating an exemplary class hierarchy of objects implemented by the hierarchies of root, class, and class instance, directories and files of the present invention. The exemplary class hierarchy 80 comprises a root class "Class Object" 82, an exemplary class "FOO" 84 and two exemplary class instances "aF001" 86 and "aF002" 88. The exemplary class "FOO" 84 comprises two class methods "A" and "B". Each of the exemplary class instances "aF001" 86, and "aF002" 88 comprises two class instance variables "X" and "Y".

As discussed earlier, the root class "Class Object" 82 is implemented with a hierarchy of a root class directory and root class files comprising the root class "Class Object" directory, the root class path file "PATH" and the class instance making method. The "Class Object" path file contains a plurality of exemplary class path directory names separated by colons, "/usr/ucb:/bin:/usr/bin" (not shown).

The exemplary class "FOO" 84 is implemented with a hierarchy of class directories and class files comprising the class "FOO" directory, the class path file "PATH", the class instance variable directory "Insvar", two class instance variable files for the initial values for the class instance variables "X" and "Y", and two class method files for storing the class methods "A" and "B". The class "FOO" path file contains a plurality of exemplary class path directory names separated by colons, "/Class Object:/usr/ucb:/bin:/usr/bin" (not shown).

Each of the two exemplary class instances "aF001" 86 and "aF002" 88 is implemented with a hierarchy of a class instance directory and class instance files comprising the class instance "aF001"/"aF002" directory, the class instance path file "PATH", and two class instance variable files for the current values of the class instance variables "X" and "Y". The class instance "aF001"/"aF002" path file contains a plurality of exemplary class path directory names separated by colons, "/ClassFOO:/ClassObject:/usr/ucb:/bin:/usr/bin" (not shown).

Figure 6:
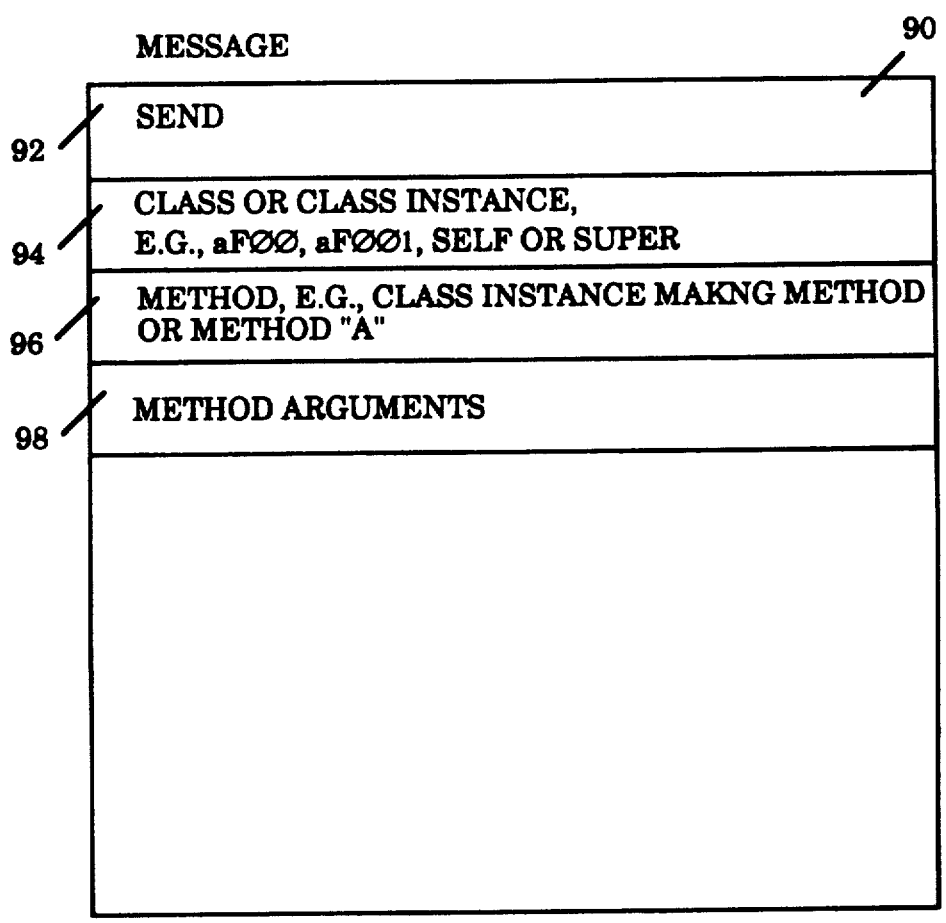
FIG. 6 shows a block diagram illustrating a message used for invoking a class method on a class instance or a class, by the message sending procedure of the apparatus of the present invention.

Referring now to FIG. 6, a block diagram illustrating a message used for invoking a class method on a class instance or a class, by the message sending procedure of the apparatus of the present invention. The message is provided to the message sending procedure of the apparatus of the present invention by a class instance/class user. The message may be provided to the message sending procedure in a variety of manners, for example, through command prompt in the UNIX environment. The message 90 comprises the identifier of the message sending procedure 92, an identifier of a class instance or a class 94, an identifier of a class method 96 and arguments for the class method 98.

The identifier of the message sending procedure 92 identifies the message sending procedure of the apparatus of the present invention to the host operating system. The message sending procedure is a member of a system default directory, for example, the home directory of the UNIX environment. The message sending procedure may be identified in a variety of manners, for example, "SEND". The identifier of a class instance or a class 94 identifies the class instance or the class upon which the identified class method 96 is to be invoked. The identifier of a class instance or a class 94 identifies a class instance or class, for examples, "aF001" or "FOO", upon which the identified class method is to be invoked. The identifier for a class method 96 identifies the class method, for examples, class instance making method, or method "A", to be invoked upon the identified class instance or class 94. The arguments for the class method 98 provides the arguments to be used by the invoked class method 96.

Additionally, in the context of a class method invoking another class method, the identifier of a class instance or a class 94, may be the pseudo class instance/class "Self", or the pseudo class "Super". The pseudo class instance/class "Self" means that the identified class method is to be invoked upon the class instance or the class that invoked the invoking class method. The pseudo class "Super" means that the identified class method is to be invoked upon the super class of the invoking class method.

Referring back to FIG. 1, upon receipt of a message 90 with an identifier for a class instance or a class, other than the pseudo class instance/class "Self" and "Super", the message sending procedure 14 changes the current directory of the hierarchical file system to the identified class instance or class's directory. In addition, the message sending procedure 14 sets the search path of the hierarchical file system to the content of the class instance or class path file under the current directory. After changing the current directory and setting the search path, the message sending procedure 14 executes the identified class method with the arguments received.

Upon receipt of a message 90 with the pseudo class instance/class "Self", the message sending procedure 14, without changing the current directory of the hierarchical file system, sets the search path of the hierarchical file system to the content of the class instance or class path file under the unchanged current directory. Similarly, after setting the search path, the message sending procedure 14 executes the identified class method with the arguments received.

Upon receipt of a message 90 with the pseudo class "Super", the message sending procedure 14, without changing the current directory of the hierarchical file system, sets the search path of the hierarchical file system to the content of the class path file under the unchanged current directory, minus the class directory name of the invoking class method. Similarly, after setting the search path, the message sending procedure 14 executes the identified class method with the arguments received.

Similar to the class instance making method and the class making procedure 12, the message sending procedure 14 may be implemented in any well known programming language, for example, UNIX Shell for the UNIX environment. FIG. 1c shows an exemplary message sending procedure implemented in UNIX Shell.

It will be appreciated that by the way the class path files and the class instance path files are implemented, and by the way the class methods are executed by the message sending procedure, inheritance of class methods, and class instance variables, one of the hallmarks of object oriented programming, is achieved. Furthermore, by accessing the class instance variables with class methods only, data abstraction, another hallmark of object oriented programming, is also achieved.

While the invention has been described in terms of a preferred embodiment, those skilled in the art will recognize that the invention is not limited to the implementation described. The method and apparatus of the present invention can be practiced with modification and alteration within the spirit and scope of the appended claims. In particular, class variables may be implemented with class variable files under the class directory similar to the class method files disclosed herein.

What is claimed is:

1. In a computer system comprising a hierarchical file system, a method for creating and accessing a class hierarchy of objects on said computer system, said method comprising the steps of:

establishing a root class by creating a collection of hierarchical directories and files of a first type using said hierarchical file system, said first type collection of hierarchical directories and files logically comprising a search path of a first type and a root class method, said first type search path being used for locating said first type collection of hierarchical directories and files, said root class method being used for generating a class instance for a non-root class subclass to said root class;

establishing non-root classes by creating collections of hierarchical directories and files of a second type using said hierarchical file system, each of said second type collections of hierarchical directories and files logically comprising a search path of a second type, each of said second type search paths being used for locating its second type collection of hierarchical directories and files and all collections of hierarchical directories and files created to establish its non-rot class' ancestral classes including said root class, each of said second type collections of hierarchical directories and files being hierarchically subordinate to the collection of hierarchical directories and files created to establish its non-root class' super class; and generating class instances of said non-root classes by creating collections of hierarchical directories and files of a third type using said hierarchical file system, each of said third type collections of hierarchical directories and files logically comprising a search path of a third type and at least one class instance variable value, each of said third type search paths being used for locating its third type collection of hierarchical directories and files and all collections of hierarchical directories and files created to establish its class instance's class, its class instance's class' ancestral classes including said root class, each of said third type collections of hierarchical directories and files being hierarchically subordinate to the second type collection of hierarchical directories and files created to establish its class instance's class.

2. The method as set forth in claim 1, wherein said method further comprises the step of invoking class methods on said class instances and said classes by sending messages to third type collections of hierarchical directories and files of said class instances and second type collections of hierarchical directories and files of said classes respectively.

3. The method as set forth in claim 2, wherein each of said messages comprises an identifier for one of said class instances/classes upon which a class method is to be invoked, an identifier for the class method to be invoked, and arguments for the class method to be invoked.

4. The method as set forth in claim 3, wherein said message sending step comprises the steps of, setting a current directory variable to the class instance/class identifier in a message, said current directory variable being a system variable of said hierarchical file system;

setting a search path variable to the search path in the third/second type collection of hierarchical directories and files of said identified class instance/class, said search path variable being a system variable of said hierarchical file system; and invoking an executable file using the class method identifier in the message, after setting said current directory variable and said search path variable.

5. The method as set forth in claim 3, wherein the class instance/class identifier in some of said messages is a pseudo class instance/class "Self", said pseudo class instance/class "Self" indicating said identified class method is to be invoked on the invoking class instance/class of the message originating class method.

6. The method for implementing a class hierarchy of objects in a hierarchical file system as set forth in claim 5, wherein said message sending step comprises the step of, setting a search path variable to the content of a current directory variable, said search path variable and said current directory variable being system variables of said hierarchical file system; and invoking an executable file using the class method identifier in the message after setting said search path variable without changing said current directory variable.

7. The method as set forth in claim 3, wherein the class instance/class identifier in some of said messages is a pseudo class "Super", said pseudo class "Super" indicating said identified class method is to be invoked on the super class of the invoking class instance/class of the message originating class method.

8. The method as set forth in claim 7, wherein sad message sending step comprises the steps of, setting a search path variable to the search path of the second type collection of hierarchical directories and files of the message originator's class minus the directory named after said message originator's class, said directory names after said message originator's class being contained in a current directory variable, said search path variable and said current directory variable being system variables of said hierarchical file system; and invoking an executable file using the class method identifier in the message after setting said search path variable without changing said current directory variable.

9. The method as set forth in claim 1, wherein each of said second type collections of hierarchical directories and files comprises:

a directory named after its class; and a search path file comprising at least one search path having a plurality of directory names including directory names of its class' ancestral classes, said search path file being a member of said directory names after its class.

10. The method as set forth in claim 1, wherein some of said second type collections of hierarchical directories and files logically further comprise selected ones of the followings:

at least one class method for operating on class instance variables of class instances of its class and classes subclass to its class; and at least one class instance variable initial value for initializing a class instance variable for class instances of its class.

11. The method as set forth in claim 10, wherein:

each of said second type collections of hierarchical directories and files, which logically further comprises at least one class method, further comprises at least one executable file for storing the class method, said at least one executable file being members of a directory names after its class in the second type collection of hierarchical directories and files created to establish its class; and each of said second type collections of hierarchical directories and files, which logically further comprises at lest one class instance variable initial value, further comprises a collection of hierarchical directories and files of a fourth type, each of said fourth type collections of hierarchical directories and files comprises a directory uniquely identified as a class instance variable directory and at least one data file, said class instance variable directory being a member of a directory named after its class in the second type collection of hierarchical directories and files created to create its class, each of said at least one data file being a member of the class instance variable directory of its fourth type collection of hierarchical directories and files, each of said at least one data file being used to store an initial value of a class instance variable for class instances of its class.

12. The method as set forth in claim 1, wherein said first type collection of hierarchical directories and files comprises:

a directory named after said root class;

a search path file comprising at least one search path having at least one directory name, said search path file being a member of said directory named after said root class; and an executable file comprising said class method for creating said third type collections of hierarchical directories and files, said executable file being a member of said directory names after said root class.

13. The method as set forth in claim 1, wherein each of said third type collections of hierarchical directories and files comprises:

a directory named after its class instance;

a search path file comprising at least one search path having directory names including directory names of its class, its class' ancestral classes, said search path file being a member of said directory named after its class instance; and at least one data file comprising a class instance variable value, said at least one data file being a member of said directory named after its class instance.

14. In a computer system comprising a hierarchical file system, an apparatus for creating and accessing a class hierarchy of objects on said computer system, said apparatus comprising:

first file creation means coupled to said hierarchical file system for establishing a root class by creating a collection of hierarchical directories and files of a first type using said hierarchical file system, said first type collection of hierarchical directories and files logically comprising a search path of a first type and a class instance making method, said first type search path being used for locating said first type collection of hierarchical directories and files, said class instance making method being used for generating class instances for non-root classes subclass to said root class; and second file creation means coupled to said hierarchical file system for establishing non-root classes by creating collections of hierarchical directories and files of a second type using said hierarchical file system, each of said second type collections of hierarchical directories and files logically comprising a search path of a second type, each of said second type search paths being used for locating its second type collection of hierarchical directories and files and all collections of hierarchical directories and files created to establish its non-root class' ancestral classes including said root class, each of said second type collections of hierarchical directions and files being hierarchically subordinate to the collection of hierarchical directories and files created to establish its non-root class' super class;

said class instance making method generating said class instance for said non-root classes by creating collections of hierarchical directories and files of a third type using said hierarchical file system, each of said third type collections of hierarchical directories and files logically comprising a search path of a third type and at least one class instance variable value, each of said third type search paths being used for locating its third type collection of hierarchical directories and files and all collections of hierarchical directories and files created to establish its class, instance's class, its class instance's class' ancestral classes including said root class, each of said third type collections of hierarchical directories and files being hierarchically subordinate to the second type collection of hierarchical directories and files created to establish its class instance's class.

15. The apparatus as set forth in claim 14, wherein said apparatus further comprises invoking means coupled to said hierarchical file system for invoking class methods on said class instances and said classes by sending messages to third type collections of hierarchical directories and files of said class instances and second type collections of hierarchical directories and files of said classes respectively.

16. The apparatus as set forth in claim 15, wherein each of said messages comprises an identifier for one of said class instances/classes upon which a class method is to be invoked, an identifier for the class method to be invoked, and arguments for the class method to be invoked.

17. The apparatus as set forth in claim 16, wherein said invoking means, upon receipt of a message addressed to a third/second type collection of hierarchical directories and files,
- sets a current directory variable to the class instance/class identifier in a message, said current directory variable being a system variable of said hierarchical file system;
- sets a search path variable to the search path in the addressed third/second type collection of hierarchical directories and files of said identified class instance/class, said search path variable being a system variable of said hierarchical file system; and
- invokes an executable file using the class method identifier in the message after setting said current file directory variable and said search path variable.

18. The apparatus as set forth in claim 16, wherein the class instance/class identifier in some of said messages is a pseudo class instance/class "Self", said pseudo class instance/class "Self" indicating said identified class method is to be invoked on the invoking class instance/class of the message originating class method.

19. The apparatus as set forth in claim 18, wherein said invoking means, upon receipt of a message addressed to a third/second type collection of hierarchical directories and files,
- sets a search path variable to the content of a current directory variable, said search path variable and said current directory variable being system variables of said hierarchical file system; and
- invokes an executable file using the class method identifier in the message after setting said search path variable without changing said current directory variable.

20. The apparatus as set forth in claim 16, wherein the class instance/class identifier in some of said messages is a pseudo class "Super", said pseudo class "Super" indicating said identified class method is to be invoked on the super class of the invoking class instance/class of the message originating class method.

21. The apparatus as set forth in claim 20, wherein said invoking means, upon receipt of a message addressed to a second type collection of hierarchical directories and files,
- sets a search path variable to the search path of the second type collection of hierarchical directories and files of the message originator's class minus the directory names after said message originator's class, said directory named after said message originator's class being contained in a current directory variable, said search path variable and said current directory variable being system variables of said hierarchical file system; and
- invokes an executable file using the class method identifier in the message after setting said search path variable without changing said current directory variable.

22. The apparatus as set forth in claim 14, wherein each of said second type collection of hierarchical directories and files comprises,
- a directory named after its class; and
- a search path file comprising at least one search path having a plurality of directory names including directory names of its class' ancestral classes, said search path file being a member of said directory named after its class.

23. The apparatus as set forth in claim 14, wherein some of said second type collections of hierarchical directories and files logically further comprises selected ones of the followings:
- at least one class method for operating on class instance variables of class instances of its class and classes subclass to its class; and
- at least one class instance variable initial value for initializing a class instance variable for class instances of its class.

24. The apparatus as set forth in claim 23, wherein
each of said second type collections of hierarchical directories and files, which logically further comprises at least one class method, further comprises at least one executable file for storing the class method, said at least one executable file being members of a directory named after its class in the second type collection of hierarchical directories and files created to establish its class; and
each of said second type collections of hierarchical directories and files, which logically further comprises at least one class instance variable initial value, further comprises a collection of hierarchical directories and files of a fourth type, each of said fourth type collections of hierarchical directories and files comprises a directory uniquely identified as a class instance variable directory and at least one data file, said class instance variable directory being a member of a directory named after its class in the second type collection of hierarchical directories and files created to create its class, each of said at least one data file being a member of the class instance variable directory of its fourth type collection of hierarchical directories and files, each of said at least one data file being used to store an initial value of a class instance variable for class instances of its class.

25. The apparatus as set forth in claim 14, wherein said first type collection of hierarchical directories and files comprises
- a directory named after said root class;
- a search path file comprising at least one search path having at least one directory name, said search path file being a member of said directory named after said root class; and
- an executable file comprising said class method for creating said third type collections of hierarchical directories and files, said executable file being a member of said directory named after said root class.

26. The apparatus as set forth in claim 14, wherein each of said third type collections of hierarchical directories and files comprises,
- a directory named after its class instance;
- a search path file comprising at least one search path having directory names including directory names of its class, its class' ancestral classes, said search path file being a member of said directory named after its class instance; and
- at least one data file comprising a class instance variable value, said at least one data file being a member of said directory named after its class instance.

* * * * *

UNITED STATES PATENT AND TRADEMARK OFFICE
CERTIFICATE OF CORRECTION

PATENT NO. : 5,187,786
DATED : February 16, 1993
INVENTOR(S) : Densmore et al.

It is certified that error appears in the above-identified patent and that said Letters Patent is hereby corrected as shown below:

In column 10, claim 1 at line 13, please delete " non-rot " and insert -- non root --.

In column 11, claim 8 at line 19, please delete " sad " and insert -- said --.

In column 11, claim 8 at line 25, please delete " names " and insert -- named --.

In column 11, claim 11 at line 64, please delete " lest " and insert -- least --.

Signed and Sealed this

Sixteenth Day of September, 1997

Attest:

BRUCE LEHMAN

Attesting Officer

Commissioner of Patents and Trademarks